United States Patent
Kuhn

(10) Patent No.: US 9,573,596 B2
(45) Date of Patent: Feb. 21, 2017

(54) SELF-PROPELLED OFF-ROAD VEHICLE WITH SYSTEM FOR TORQUE CONTROL AT SHIFT POINTS

(71) Applicant: CNH Industrial America LLC, New Holland, PA (US)

(72) Inventor: Frederic George Kuhn, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/138,719

(22) Filed: Apr. 26, 2016

(65) Prior Publication Data

US 2016/0318517 A1 Nov. 3, 2016

Related U.S. Application Data

(60) Provisional application No. 62/153,792, filed on Apr. 28, 2015.

(51) Int. Cl.

| | |
|---|---|
| *B60W 30/18* | (2012.01) |
| *B60W 30/188* | (2012.01) |
| *B60W 10/06* | (2006.01) |
| *B60W 10/11* | (2012.01) |
| *F16H 63/50* | (2006.01) |
| *F02D 41/30* | (2006.01) |
| *A01C 23/04* | (2006.01) |

(52) U.S. Cl.
CPC ........ *B60W 30/1882* (2013.01); *A01C 23/047* (2013.01); *B60W 10/06* (2013.01); *B60W 10/11* (2013.01); *F02D 41/3005* (2013.01); *F16H 63/50* (2013.01); *B60W 2300/154* (2013.01); *B60W 2710/0616* (2013.01); *B60W 2710/0644* (2013.01); *B60W 2710/0666* (2013.01); *B60W 2710/1005* (2013.01)

(58) Field of Classification Search
CPC .............................. A01C 23/047; F16H 63/50
See application file for complete search history.

(56) References Cited

U.S. PATENT DOCUMENTS

| | | | |
|---|---|---|---|
| 6,705,971 | B2 | 3/2004 | Kayano et al. |
| 7,169,079 | B2 | 1/2007 | Tokura et al. |
| 7,335,132 | B2 | 2/2008 | Yeo |
| 7,389,176 | B2 | 6/2008 | Kadono et al. |
| 7,549,944 | B2 | 6/2009 | Tabata et al. |
| 7,651,440 | B2 | 1/2010 | Runde |
| 7,748,362 | B2 | 7/2010 | Whitney et al. |
| 8,337,360 | B2 | 12/2012 | Lee |
| 8,437,938 | B2 | 5/2013 | Whitney et al. |

(Continued)

FOREIGN PATENT DOCUMENTS

GB        2315132 A       1/1998

*Primary Examiner* — Derek D Knight

(74) *Attorney, Agent, or Firm* — Rebecca L. Henkel; Rickard K. DeMille

(57) ABSTRACT

A self-propelled off-road agricultural vehicle such as a product applicator is provided with a system for torque control at shift points. The self-propelled applicator has a drivetrain configured with two power levels of its engine. One power level limits engine power output to a value at or below a shifting-state clutch rating of the transmission to protect the transmission while shifting. The second power level allows engine power to exceed a shifting-state clutch rating of the transmission when the transmission is not shifting.

20 Claims, 3 Drawing Sheets

(56) References Cited

U.S. PATENT DOCUMENTS

| | | |
|---|---|---|
| 8,617,028 B2 | 12/2013 | Kresse et al. |
| 8,696,517 B2 | 4/2014 | Whitney et al. |
| 8,894,544 B2 | 11/2014 | Gibson et al. |
| 8,897,977 B2 | 11/2014 | Long et al. |
| 9,133,924 B2 | 9/2015 | Schoolcraft |
| 2002/0149659 A1* | 10/2002 | Wu .................. C09D 11/101 347/102 |
| 2009/0118912 A1* | 5/2009 | Hugenroth ......... A01D 41/1274 701/50 |
| 2013/0066528 A1 | 3/2013 | Kresse et al. |
| 2014/0358400 A1 | 12/2014 | Whitney et al. |
| 2015/0088391 A1 | 3/2015 | Ishikawa et al. |

* cited by examiner

SELF-PROPELLED OFF-ROAD VEHICLE WITH SYSTEM FOR TORQUE CONTROL AT SHIFT POINTS

CROSS REFERENCE TO RELATED APPLICATIONS

This is a non-provisional application based upon U.S. provisional patent application Ser. No. 62/153,792, entitled "Self-propelled Off-road Vehicle with System for Torque Control at Shift Points," filed Apr. 28, 2015, which is incorporated herein by reference.

FIELD OF THE INVENTION

The invention relates generally to agricultural product application equipment such as self-propelled sprayers and, in particular, to a self-propelled off-road agricultural vehicle with a system for torque control at shift points.

BACKGROUND OF THE INVENTION

Engine power management to reduce power during shifting is known for on-road trucks, in efforts to improve transmission longevity. Compared to on-road trucks, agricultural and other off-road vehicles operate at substantially slower travel speeds and can operate in some conditions offering less traction, which can lessen at least some types of loading and other forces in off-road transmissions. Transmissions in such off-road applications therefore can experience different operating parameters and different considerations for ensuring acceptable use lives compared to on-road trucks. However, agricultural and other off-road vehicles such as self-propelled applicators including sprayers and spreaders are getting larger.

As self-propelled applicators get larger, the power requirements to operate the spray systems, dry product delivery system, and other accessories have correspondingly increased. Engines with higher torque output ratings have been used to meet the increased power requirements of recent self-propelled applicators. When comparing on-road trucks to self-propelled applicators, an on-road truck can have relatively more of its engine power output utilized for propelling the truck and its load whereas a self-propelled applicator can have a substantial amount of its engine power output utilized for powering its operational systems including various auxiliary systems such as sprayer or spreader systems and large hydraulic systems to hydraulically power boom folding and other movements as well as to hydraulically power front wheel assist drive systems.

Transmission ratings are greatly influenced by the abilities of clutches that perform drive ratio changes or the shifts. The transmission is typically capable of more torque transfer when the drive ratio is static versus when the drive ratio is changing or shifting gears. Accordingly, the transmission has both a relatively greater non-shifting-state transmission ratings) and a relatively lesser shifting-state transmission rating(s) that correspond to a relatively greater non-shifting-state clutch rating(s) and a relatively lesser shifting-state clutch rating(s).

However, some of the high output engines required to power the various systems of larger self-propelled applicators can deliver more torque during operation than the shifting-state clutch ratings of the transmissions. Heavy duty industrial off-road transmissions with shifting-state clutch ratings that match or exceed power output ratings of such high output engines are expensive, large, and heavy. Known attempts to implement such high output engines in the larger self-propelled applicators typically include using control systems that always limits engine torque across its entire power band so that engine torque output never exceeds the shifting-state clutch ratings) of the transmission.

SUMMARY OF THE INVENTION

A self-propelled off-road agricultural vehicle such as a product applicator is provided with a system for torque control at shift points. The self-propelled applicator has a drivetrain configured with two power levels of its engine. One power level limits engine power output to a value at or below a shifting-state clutch rating of the transmission to protect the transmission while shifting. The second power level allows engine power to exceed a shifting-state clutch rating of the transmission when the transmission is not shifting.

According to one aspect of the invention, an engine of the self-propel led applicator is allowed to operate at a greater torque output than a shifting-state clutch rating of a transmission when the transmission is not actively shifting. During shifts, engine torque is automatically reduced below a maximum torque value of the shifting-state clutch rating of the transmission while maintaining an engine torque output value that is sufficient to power the operational systems such as sprayer or spreader systems and hydraulic systems of the self-propelled applicator. After completion of shifts, the engine is again allowed to operate at the greater torque output that exceeds the shifting-state clutch rating of the transmission.

According to another aspect of the invention, the engine may be limited to a reduced maximum torque output value below actual maximum torque rating value of the engine. The reduced torque maximum torque output value of the engine is less than the non-shifting-state clutch rating of the transmission and may exceeds the shifting-state clutch rating of the transmission, When the transmission is not shifting, the engine is allowed to operate at a torque level that exceeds the shifting-state clutch rating of the transmission. A transmission controller may send commands or otherwise communicate with an engine controller to momentarily reduce engine torque during shift events of the transmission to a lower torque output. This provides an engine torque curve that has periodic torque reductions that correspond in time to shifting events of the transmission. The engine torque reductions during the shifting events reduce engine torque to values that are no more than the shifting-state clutch rating, unloading the clutches during the shift events while maintaining sufficient power output from the engine to power the operational systems without interruption.

According to another aspect of the invention, the off-road self-propelled agricultural vehicle includes a chassis having wheels for moving the off-road self-propelled agricultural sprayer and mechanical drivetrain system delivering power to the wheels. An application system is supported by the chassis and included at least one storage container storing a volume of product for delivery on to an agricultural field, The mechanical drivetrain system includes an internal combustion engine supported in the chassis. An automatic transmission is supported in the chassis and receives power from the internal combustion engine for delivering to the wheels. The automatic transmission has clutches configured to selectively engage and disengage to change a power flow path through the transmission and correspondingly mechanically change the drive ratio through the transmission to one of multiple discrete predefined drive ratios. The transmission defines a transmission shifting-state rating and a transmission non-shifting-state rating with the shifting-state rating having a lower value than the non-shifting-state rating. The mechanical drivetrain system defines a first state as a non-shifting state during which time the drive ratio of the transmission is static and the transmission is not shifting. The mechanical drivetrain system defines a second state as a shifting state during which time the drive ratio of the transmission is changing while shifting. During the first state, the engine is in an unrestricted condition to permit delivery of power to the transmission with an unrestricted torque value that is greater than the transmission shifting-state rating value. During the second state, the engine is restricted to a restricted condition to limit delivery of power to the transmission to a restricted torque value that is less than the transmission shifting-state rating value.

According to another aspect of the invention, a control system may include an engine controller configured to control engine torque output and/or speed and corresponding engine torque output values and a transmission controller configured to control clutches of the transmission for shifting the transmission to change the drive ratio of the transmission. The transmission controller sends command signals to the engine controller for commanding reduction in engine torque output values corresponding to changes from the first state to the second state of the mechanical drivetrain system.

According to another aspect the invention, the engine may define a maximum operational engine torque value that corresponds to a power output of the engine after power reduction from parasitic losses. The maximum operational engine is no greater than the transmission non-shifting-state rating value.

According to another aspect of the invention, the off-road self-propelled agricultural vehicle is a self-propelled agricultural product applicator. The vehicle may be a self-propelled agricultural sprayer that sprays liquid product or may be configured as a dry applicator with a dry box for broadcast spreading of a dry product onto the agricultural field.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
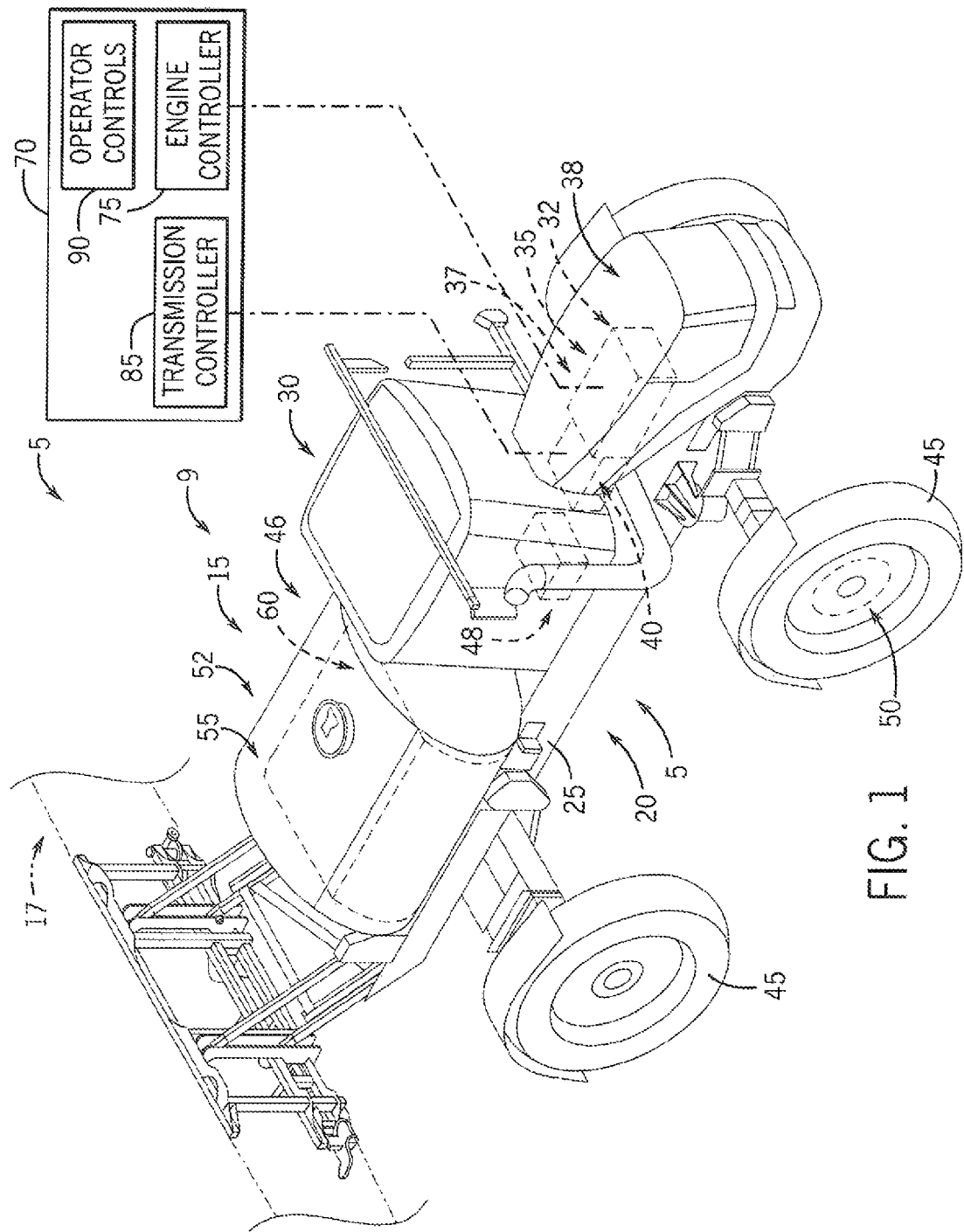
FIG. 1 is a pictorial view of an off-road agricultural vehicle with a system for torque control at shift points according to the present invention.

Referring now to the drawings and specifically to FIG. 1, a system for engine torque control at transmission shift points is shown as torque control system 5 used here with an off-road agricultural vehicle 9. Off-road agricultural vehicle 9 is represented as an applicator 15, shown here as a rear-boom self-propelled agricultural sprayer vehicle or rear-boom self-propelled sprayer, such as those available from CNH Industrial, such as the Miller Condor Series sprayers and New Holland Guardian Series rear-boom sprayers. Although applicator 15 is shown as a rear-boom self-propelled sprayer, it is understood that applicator 15 can instead be configured as a dry product spreader with a dry box or spinner box for broadcast-type delivery of dry product. Furthermore, applicator 15 can instead be a front-boom sprayer, such as those available from CNH Industrial, including the Miller Nitro and New Holland Guardian Series front-boom sprayers. It is further understood that off-road agricultural vehicle 9 may include other self-propelled implements, tractors, or other off-road agricultural vehicles 9.

Referring again to FIG. 1, applicator 15 includes chassis 20 having chassis frame 25 that supports various assemblies, systems, and components. These various assemblies, systems, and components include boom system 17, cab 30, and mechanical drivetrain system 32 that includes engine 35 housed in engine compartment 37 defined inwardly of hood 38 and transmission 40 receiving power from engine 35. Transmission 40 is a multi-speed a heavy-duty transmission, such as an industrial automatic transmission. Transmission 40 has internal clutches that selectively engage and disengage to change a power flow path through the transmission and correspondingly mechanically change the drive ratio through the transmission to one of multiple discrete pre-defined drive ratios based on the particular configuration of the transmission 40. Transmission 40 delivers power for rotating wheels 45 by way of power-transmitting driveline components such as drive shafts, differentials, and other gear sets in portal, drop boxes, or other housings. Applicator 15 has operational system(s) 46 including various auxiliary systems such as hydraulic system 48 configured to provide hydraulic power for movement type operations of the boom system 17, including raising/lowering, tilting, and folding the boom. Hydraulic system 48 also provides hydraulic power for rotating the front wheels 45 by way of a hydraulically powered front wheel assist drive system 50.

Operational system(s) 46 includes a product application systems such as a spreader system (not shown) for applying dry product to an agricultural field or a spray system 52. Spray system 52 includes storage containers such as a rinse tank storing water or a rinsing solution and product tank 55 that stores a volume of product 60 for delivery onto an agricultural field with applicator 15. Product 60 includes any of a variety of agricultural liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a foldable and height adjustable boom of the boom system 17 for release out of spray nozzles that are spaced from each another along the width of boom during spraying operations of applicator 15.

Still referring to FIG. 1, torque control system 5 cooperates with a control system 70 that includes engine controller 75 and transmission controller 85. Engine controller 75 is configured to control engine operation such as engine speed and corresponding engine torque output values. Control system 70 includes operator controls 90, which provide a user interface(s) allowing an operator to control the mechanical drivetrain system 32 and other components of the applicator 15. Operator controls 90 may include throttle controls such as a foot throttle and a hand throttle, operably connected to control system 70 and configured to allow the operator to control engine speed.

Each of the engine and transmission controllers 75, 85 includes a microprocessor and may be implemented as a programmable logic controller (PLC) other industrial computer, along with corresponding software and suitable memory for storing such software and hardware including interconnecting conductors for power and signal transmission and communication for controlling electronic, electromechanical, pneumatic, and hydraulic components of the mechanical drivetrain system 32 or other components of off-road agricultural vehicle 9. Communication may be done through direct interconnection such as directly routed wiring harnesses or through one or more serial bus systems such as a CAN (controller area network) bus(es) between the engine and transmission controller 75, 85 and through which other signal transmission occurs for other systems for controlling various intelligent devices as well as sensors, actuators, and/or other components of off-road agricultural vehicle 9 for monitoring and controlling the corresponding systems and components of the off-road agricultural vehicle 9, which may be established as nodes on the bus. The CAN bus(es) may implement an ISO or other suitable specification or protocol. In this way, control system 70 is configured for controlling operational characteristics of engine 35 including torque output and of transmission 40 including control of shifting, as well as steering, speed, braking, shifting, and other operations of the off-road agricultural vehicle 9.

Figure 2:
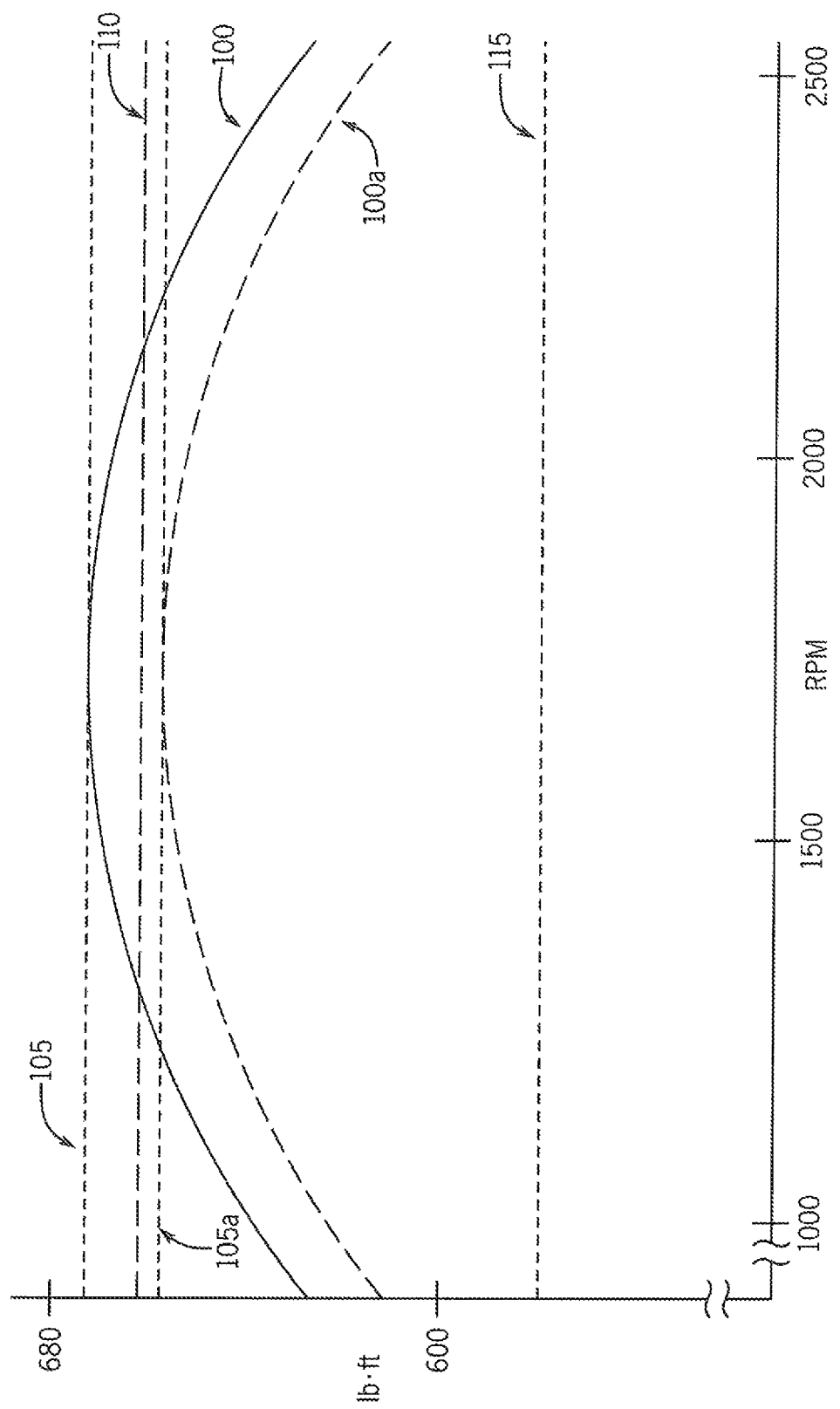
FIG. 2 is a graph of various engine and transmission operating characteristics according to the present invention.

Referring now to FIG. 2, the illustrated graph shows torque ratings for engine 35 and transmission 40 (plotted as pound-foot torque versus revolutions per minute by way of example). Engine torque curve 100 shows torque output as a function of engine operating speed. Engine 35 has an engine manufacturer maximum torque output rating value, represented by the dashed line maximum engine torque value 105. Maximum engine torque value 105 may be the value(s) such as maximum torque output values or corresponding rating values posted in trade publications and/or advertising provided by the manufacturer. Torque control system 5 may control the engine 35 to govern its output to a maximum operational torque output rating value that is less than the engine manufacturer maximum torque output rating value, depending on the particular relative power ratings of engine 35 and transmission 40. Transmission 40 has two power ratings and the torque control system 5 is configured to control engine 35 to define two power levels that correspond to the two power ratings of transmission 40. The power ratings of transmission 40 include a relatively greater non-shifting-state ratings) and a relatively lesser shifting-state rating(s). The non-shifting-state rating corresponds to a maximum power that can be handled by transmission 40 when it is not shifting and its drive ratio is static. The non-shifting-state rating is represented by the dashed-line 110 and may correspond to rating values posted in trade publications and/or advertising provided by the manufacturer. As shown in FIG. 2, the engine 35 may have a maximum engine torque value 105 that is greater than the non-shifting-state rating 110 with a maximum operational engine torque value 105a that is less than the non-shifting-state rating 110. Maximum operational engine torque value 105a represents actual power output of engine 35 taking into account all parasitic losses of power that are present even when none of the operational systems 46 are being used. Such parasitic losses include power losses attributable to rotating engine accessories and alternator, a fan of a cooling package, and other accessories that may always be powered. Engine operational torque curve 100a represents a torque curve of engine 35 taking into account the parasitic losses. Power of engine 35 during use according to engine operational torque curve 100a outputs more torque than the shifting-state rating of transmission 40. The shifting-state rating of transmission 40 is represented by the dashed-line 115.

Figure 3:
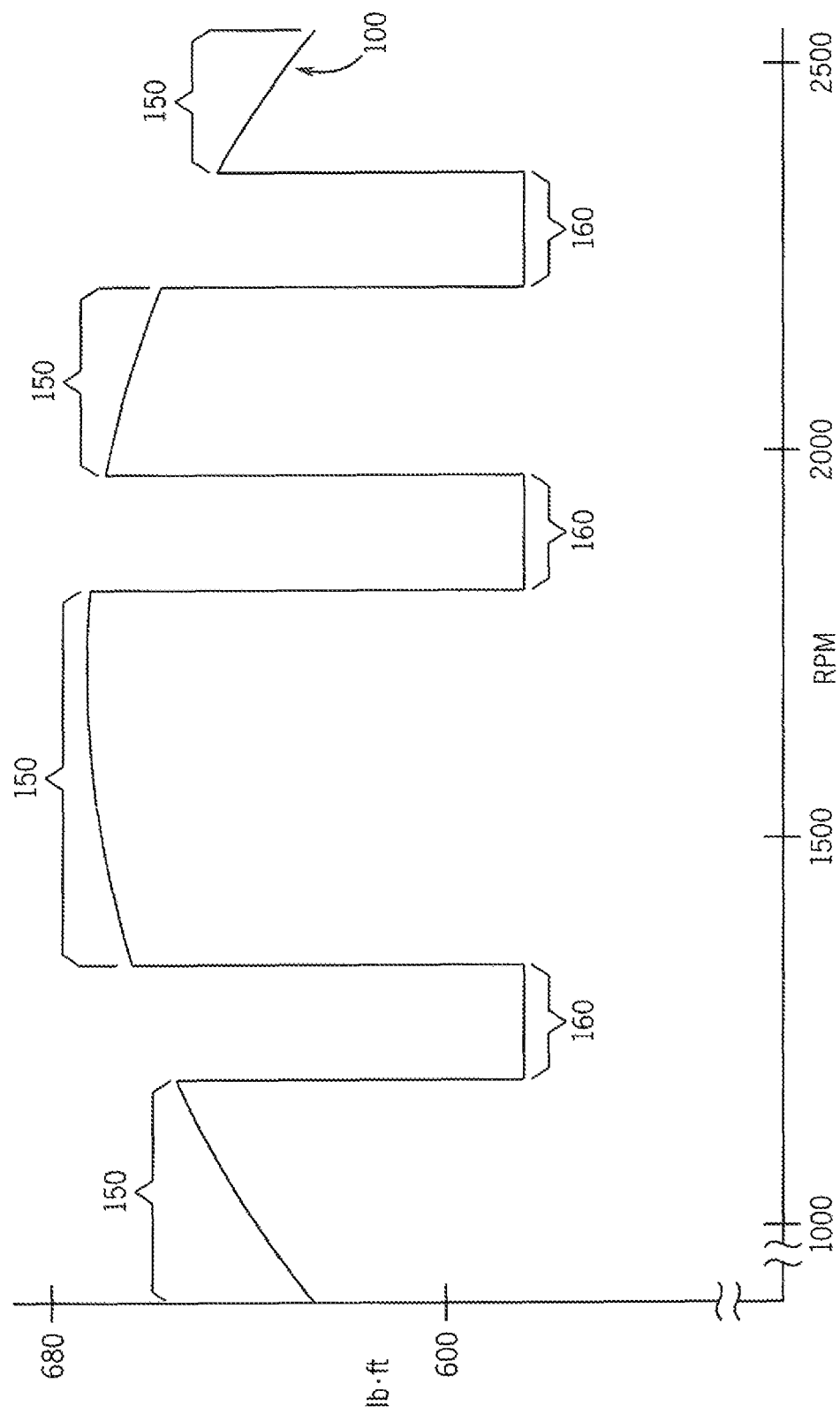
FIG. 3 is another graph of various engine and transmission operating characteristics according to the present invention.

Referring now to FIGS. 1 and 3, torque control system 5 is configured to allow the engine 35 to output a greater torque output value than the shifting-state rating 115 of the transmission 40, when the transmission 40 is not actively shifting. During shifts, torque control system 5 reduces engine torque below the shifting-state rating 115. After completion of shifts, torque control system 5 allows engine 35 to again provide torque at values that are greater than the shifting-state rating 115. This is done by the torque control system 5 allowing the mechanical drivetrain system 32 to operate in a first state as a non-shifting state 150 during which time a drive ratio of the transmission 40 is static and in a second state as a shifting state 160 during which time the drive ratio of the transmission 40 is changing.

Still referring to FIGS. 1 and 3, during the non-shifting state 150, torque control system 5 does not command overriding control of the engine 35, allowing the engine 35 to operate in an unrestricted condition. In the unrestricted condition, engine 35 is permitted to deliver power to the transmission 40 with an unrestricted torque value and thus allowed to output torque up to the maximum operational engine torque value 105a which is greater than the transmission shifting-state rating 115.

Still referring to FIGS. 1 and 3, during the shifting state 160, torque control system 5 commands over control of the engine 35, independent of an operator throttle command provided through the operator controls 90. During the overriding control of engine 35, torque control system 5 commands the engine 35 to operate in a restricted condition. In the restricted condition, engine 35 is controlled to reduce torque, and as a result, limit delivery of power, by way of a torque reduction command to ensure that the engine torque output does not exceed the transmission shifting-state rating 115.

Still referring to FIGS. 1 and 3, torque control system 5 may be configured to reduce power output from engine 35, with the power reduction synchronized with shifting events of transmission 40. Torque control system 5 reduces power output from engine 35 by, for example, controlling a fuel delivery system for diesel engine versions of engine 35 to reduce the amount of fuel delivered to engine 35, such as controlling an actuator that moves a fuel control linkage or other control device of an injector pump and/or adjusting pulse width of injectors. This reduces engine torque output to a predetermined torque reduction level which may be stored in a lookup table or otherwise stored in an acceptable retrievable format in the control system 70, corresponding to the shifting state 160. The predetermined torque reduction level may be a single target reduced torque output level for all gear changes or may be different specific target reduced torque output levels based on the particular gear change that is being performed. Regardless, the synchronized reduction in engine torque with the shifting events ensures that the shifting of transmission 40 occurs with unloaded clutches within the transmission 40, or at least when the clutches of transmission 40 are transmitting relatively less torque. At a time corresponding to preparation of a shifting event of transmission 40, transmission controller 85 sends a command signal(s) as the torque reduction command to the engine controller 75 to command reduction in engine torque output of the engine 35. This simultaneously reduces torque from engine 35 while changing the state of the mechanical drivetrain system 32 from the non-shifting state 150 to the shifting state 160. Accordingly, the resultant torque output of the transmission may be smoother, resulting in less cyclical stress on downstream drivetrain components.

In some aspects, engine torque may be ramped down for transitions from a "non-shifting state" to a "shifting state" and, conversely, engine torque may be ramped up for transitions from a "shifting state" to a "non-shifting" state. This may be done, for example, to smooth transitions between gear ratios.

In light of the above, torque control system 5 may allow for use of smaller, lighter, more compact transmissions while protecting the transmission during shifting events.

Many changes and modifications could be made to the invention without departing from the spirit thereof. The scope of these changes will become apparent from the appended claims.

I claim:

1. A self-propelled off-road agricultural vehicle comprising:
    a chassis having wheels for moving the off-road self-propelled agricultural vehicle;
    an application system supported by the chassis and including at least one storage container storing a volume of product for delivery on to an agricultural field;
    a mechanical drivetrain system for delivering power to the wheels and including an internal combustion engine supported by the chassis;
        an automatic transmission supported by the chassis and receiving power from the internal combustion engine for delivering to the wheels and having clutches configured to selectively engage and disengage to change a power flow path through the transmission and correspondingly mechanically change a drive ratio through the transmission to one of multiple discrete predefined drive ratios;
    wherein the transmission defines a transmission shifting-state rating and a transmission non-shifting-state rating with the shifting-state rating having a lower value than the non-shifting-state rating;
    wherein the mechanical drivetrain system defines:
        a first state as a non-shifting state during which time a drive ratio of the transmission is static;
        a second state as a shifting state during which time the drive ratio of the transmission is changing; and
    wherein the mechanical drivetrain system is configured so that:
        during the first state, the engine is in an unrestricted condition to permit delivery of power to the transmission with an unrestricted torque value that is greater than the transmission shifting-state rating value; and
        during the second state, the engine is in a restricted condition to limit delivery of power to the transmission to a restricted torque value that is less than the transmission shifting-state rating value.

2. The self-propelled off-road agricultural vehicle of claim 1, further comprising a control system including an engine controller configured to control engine speed and corresponding engine torque output values and a transmission controller configured to control clutches of the transmission for shifting the transmission to change the drive ratio of the transmission, and wherein the transmission controller sends command signals to the engine controller for commanding reduction in engine torque output values corresponding to changes from the first state to the second state of the mechanical drivetrain system.

3. The self-propelled off-road agricultural vehicle of claim 2, wherein the engine defines a maximum operational engine torque value that corresponds to a power output of the engine after power reduction from parasitic losses and wherein the maximum operational engine torque value is no greater than the transmission non-shifting-state rating value.

4. The self-propelled off-road agricultural vehicle of claim 3, wherein the control system further includes operator controls providing a user interface allowing an operator to control the mechanical drivetrain system.

5. The self-propelled off-road agricultural vehicle of claim 4, wherein the operator controls include at least one of a foot throttle and a hand throttle, the at least one of a foot throttle and a hand throttle being configured to allow the operator to control engine speed.

6. The self-propelled off-road agricultural vehicle of claim 3, wherein the engine controller and the transmission controller are in communication via a CAN (Controller Area Network) bus.

7. The self-propelled off-road agricultural vehicle of claim 2, wherein the control system is configured to control engine torque output values to a predetermined torque reduction level stored in a lookup table.

8. The self-propelled off-road agricultural vehicle of claim 7, further comprising a plurality of predetermined torque reduction levels stored in the lookup table, each predetermined torque reduction level corresponding to a particular gear change to be performed.

9. The self-propelled off-road agricultural vehicle of claim 1, wherein the off-road agricultural vehicle is a self-propelled sprayer.

10. The self-propelled off-road agricultural vehicle of claim 9, further comprising a hydraulic system and a boom system having sprayers, wherein the hydraulic system is configured to provide hydraulic power for movement of the boom system.

11. The self-propelled off-road agricultural vehicle of claim 1, wherein the off-road agricultural vehicle is a self-propelled spreader.

12. The self-propelled off-road agricultural vehicle of claim 1, Wherein power reduction from the first state to the second state is synchronized with shifting events of transmission.

13. The self-propelled off-road agricultural vehicle of claim 12, further comprising a fuel delivery system including at least one of an actuator operable to move a fuel control linkage and injectors operable to receive a pulse, wherein power reduction from the first state to the second state is provided by controlling the fuel delivery system.

14. A self-propelled off-road agricultural sprayer comprising:
    a chassis having wheels for moving the off-road self-propelled agricultural sprayer;
    an application system supported by the chassis and including at least one storage container storing a volume of product for delivery on to an agricultural field;
    a hydraulic system and a boom system having sprayers, wherein the hydraulic system is configured to provide hydraulic power for movement of the boom system;
    a mechanical drivetrain system for delivering power to the wheels and including
        an internal combustion engine supported by the chassis;

an automatic transmission supported by the chassis and receiving power from the internal combustion engine for delivering to the wheels and having clutches configured to selectively engage and disengage to change a power flow path through the transmission and correspondingly mechanically change a drive ratio through the transmission to one of multiple discrete predefined drive ratios;

wherein the transmission defines a transmission shifting-state rating and a transmission non-shifting-state rating with the shifting-state rating having a lower value than the non-shifting-state rating;

wherein the mechanical drivetrain system defines:
  a first state as a non-shifting state during which time a drive ratio of the transmission is static;
  a second state as a shifting state during which time the drive ratio of the transmission is changing; and
wherein the mechanical drivetrain system is configured so that:
  during the first state, the engine is in an unrestricted condition to permit delivery of power to the transmission with an unrestricted torque value that is greater than the transmission shifting-state rating value; and
  during the second state, the engine is in a restricted condition to limit delivery of power to the transmission to a restricted torque value that is less than the transmission shifting-state rating value, and including:
    a control system including an engine controller configured to control engine speed and corresponding engine torque output values; and
    a transmission controller configured to control clutches of the transmission for shifting the transmission to change the drive ratio of the transmission,
wherein the transmission controller sends command signals to the engine controller for commanding reduction in engine torque output values corresponding to changes from the first state to the second state of the mechanical drivetrain system.

15. The self-propelled off-road agricultural sprayer of claim 14, wherein the engine defines a maximum operational engine torque value that corresponds to a power output of the engine after power reduction from parasitic losses and wherein the maximum operational engine torque value is no greater than the transmission non-shifting-state rating value.

16. The self-propelled off-road agricultural sprayer of claim 14, wherein the control system further includes operator controls providing a user interface allowing an operator to control the mechanical drivetrain system, wherein the operator controls include at least one of a foot throttle and a hand throttle, the at least one of a foot throttle and a hand throttle being configured to allow the operator to control engine speed.

17. The self-propelled off-road agricultural sprayer of claim 14, wherein the control system is configured to control engine torque output values to a predetermined torque reduction level stored in a lookup table.

18. The self-propelled off-road agricultural vehicle of claim 17, further comprising a plurality of predetermined torque reduction levels stored in the lookup table, each predetermined torque reduction level corresponding to a particular gear change to be performed.

19. The self-propelled off-road agricultural sprayer of claim 14, wherein power reduction from the first state to the second state is synchronized with shifting events of transmission.

20. The self-propelled off-road agricultural sprayer of claim 19, further comprising a fuel delivery system including at least one of an actuator operable to move a fuel control linkage and injectors operable to receive a pulse, wherein power reduction from the first state to the second state is provided by controlling the fuel delivery system.

* * * * *